(12) United States Patent
Dubay et al.

(10) Patent No.: US 11,820,422 B2
(45) Date of Patent: Nov. 21, 2023

(54) RAKE LOCK MECHANISM FOR STEERING COLUMN

(71) Applicant: Steering Solutions IP Holding Corporation, Saginaw, MI (US)

(72) Inventors: Kurt D. Dubay, Merrill, MI (US); Anthony R. Talhelm, Flint, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1 day.

(21) Appl. No.: 16/868,035

(22) Filed: May 6, 2020

(65) Prior Publication Data
US 2021/0276608 A1   Sep. 9, 2021

Related U.S. Application Data

(60) Provisional application No. 62/984,628, filed on Mar. 3, 2020.

(51) Int. Cl.
*B62D 1/184*  (2006.01)
*B62D 1/187*  (2006.01)

(52) U.S. Cl.
CPC ............. *B62D 1/184* (2013.01); *B62D 1/187* (2013.01)

(58) Field of Classification Search
CPC ................................ B62D 1/184; B62D 1/187
See application file for complete search history.

(56) References Cited

U.S. PATENT DOCUMENTS

| | | | |
|---|---|---|---|
| 6,578,449 B1* | 6/2003 | Anspaugh | B62D 1/16 74/484 R |
| 7,077,432 B2* | 7/2006 | Manwaring | B60Q 1/1469 74/473.31 |
| 7,495,584 B1* | 2/2009 | Sorensen | B60Q 1/1476 341/20 |
| 7,827,880 B2* | 11/2010 | Riefe | B62D 1/184 74/493 |
| 7,861,615 B2* | 1/2011 | Harris | B62D 1/184 74/493 |
| 7,963,561 B2* | 6/2011 | Waibel | B62D 1/184 280/777 |
| 8,505,408 B2* | 8/2013 | Havlicek | B62D 1/195 74/493 |
| 8,517,422 B2* | 8/2013 | Zaloga | F16D 1/04 280/775 |
| 8,601,901 B2* | 12/2013 | Ishii | B62D 1/184 74/493 |
| 8,657,338 B2* | 2/2014 | Buzzard | B62D 1/184 280/775 |
| 8,714,047 B2* | 5/2014 | Yamamoto | B62D 1/185 74/493 |

(Continued)

*Primary Examiner* — Laura Freedman
(74) *Attorney, Agent, or Firm* — Dickinson Wright PLLC (57) ABSTRACT

A steering column assembly includes a jacket pivotable about a rake axis. The steering column assembly also includes a pin having a rake adjustment lever operatively coupled to a first end of the pin, the rake adjustment lever on a first side of the jacket, the pin moveable along a first axis between a locked position and an unlocked position. The steering column assembly further includes a cam assembly operatively coupled to the rake adjustment lever and the pin and located on the first side of the jacket. The steering column assembly yet further includes a teeth locking mechanism operatively coupled to the pin and located on the first side of the jacket.

4 Claims, 11 Drawing Sheets

(56) References Cited

U.S. PATENT DOCUMENTS

| | | | | |
|---|---|---|---|---|
| 8,997,603 B2* | 4/2015 | Buzzard | ............... | B62D 1/184 |
| | | | | 74/493 |
| 9,073,573 B2* | 7/2015 | Sugiura | ............... | B62D 1/18 |
| 9,085,320 B2* | 7/2015 | Appleyard | ............... | B62D 1/184 |
| 9,120,503 B2* | 9/2015 | Sugiura | ............... | B62D 1/184 |
| 9,187,115 B2* | 11/2015 | Kakishita | ............... | B62D 1/184 |
| 9,376,135 B2* | 6/2016 | Sakata | ............... | B62D 1/187 |
| 9,446,781 B2* | 9/2016 | Tanaka | ............... | B62D 1/184 |
| 9,469,330 B2* | 10/2016 | Tanaka | ............... | B62D 1/184 |
| 9,580,100 B2* | 2/2017 | Tomiyama | ............... | B62D 1/184 |
| 9,604,663 B2* | 3/2017 | Tomiyama | ............... | B62D 1/187 |
| 9,718,490 B2* | 8/2017 | Tanaka | ............... | B62D 1/184 |
| 9,840,270 B2* | 12/2017 | Tomiyama | ............... | B62D 1/184 |
| 2009/0019963 A1* | 1/2009 | Hubrecht | ............... | B62D 1/184 |
| | | | | 74/493 |
| 2013/0174684 A1* | 7/2013 | Burns | ............... | B62D 1/184 |
| | | | | 74/493 |
| 2016/0176433 A1* | 6/2016 | Okano | ............... | B62D 1/184 |
| | | | | 74/495 |
| 2019/0111962 A1* | 4/2019 | Kurokawa | ............... | B62D 1/184 |
| 2021/0300296 A1* | 9/2021 | Morphy | ............... | B60R 25/01 |

* cited by examiner

RAKE LOCK MECHANISM FOR STEERING COLUMN

CROSS-REFERENCE TO RELATED APPLICATION

This application claims priority to U.S. Provisional Patent Application Ser. No. 62/984,628, filed Mar. 3, 2020, the disclosure of which is incorporated by reference herein in its entirety.

FIELD OF THE INVENTION

The disclosure herein relates to steering systems and, more particularly, to a rake lock mechanism for vehicle steering systems.

BACKGROUND

Vehicle steering columns are often adjustable in a substantially vertical direction for driver convenience and preference. This adjustability is referred to a rake adjustment of the steering column. Some manual rake adjustment assemblies have a locking mechanism mounted to a side of the steering column that is opposite to the side that the rake lever is located. For example, from a driver's perspective, a lever may be mounted to a left side of the steering column, while the components of the locking mechanism are located on the right side of the steering column. However, such packaging may undesirably preclude the ability to include a column mounted shift mechanism.

SUMMARY OF THE DISCLOSURE

According to one aspect of the disclosure, a steering column assembly includes a jacket pivotable about a rake axis. The steering column assembly also includes a pin having a rake adjustment lever operatively coupled to a first end of the pin, the rake adjustment lever on a first side of the jacket, the pin moveable along a first axis between a locked position and an unlocked position. The steering column assembly further includes a cam assembly operatively coupled to the rake adjustment lever and the pin and located on the first side of the jacket. The steering column assembly yet further includes a teeth locking mechanism operatively coupled to the pin and located on the first side of the jacket.

According to another aspect of the disclosure, a steering column assembly includes a jacket pivotable about a rake axis. The steering column assembly also includes a pin having a rake adjustment lever operatively coupled to a first end of the pin, the rake adjustment lever on a first side of the jacket. The steering column assembly further includes a teeth locking mechanism operatively coupled to the pin and located on the first side of the jacket. The steering column assembly yet further includes a shift mechanism mounted to a second side of the jacket.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
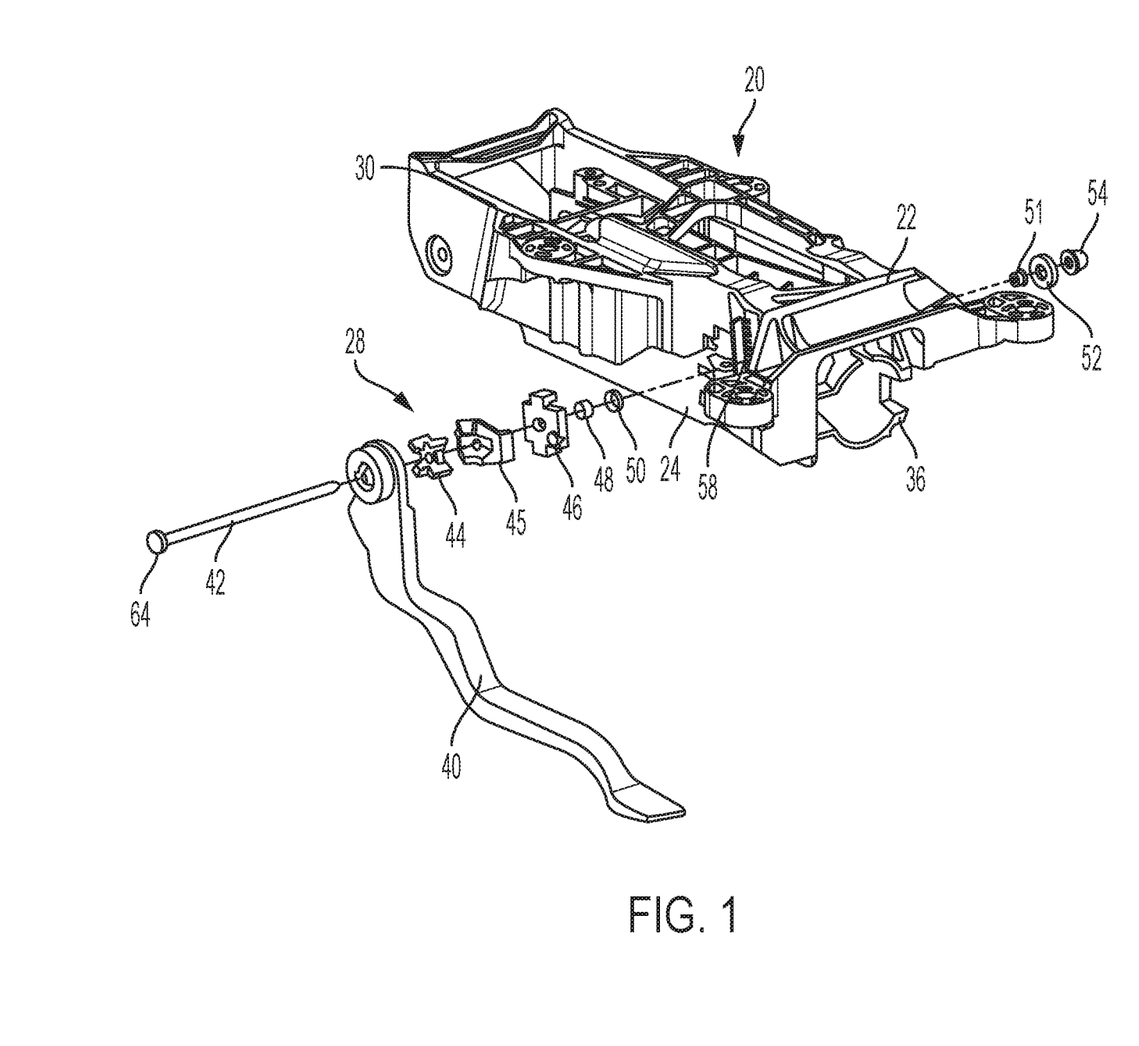
FIG. 1 is a perspective, disassembled view of a rake adjustment assembly for a steering column.
Figure 2:
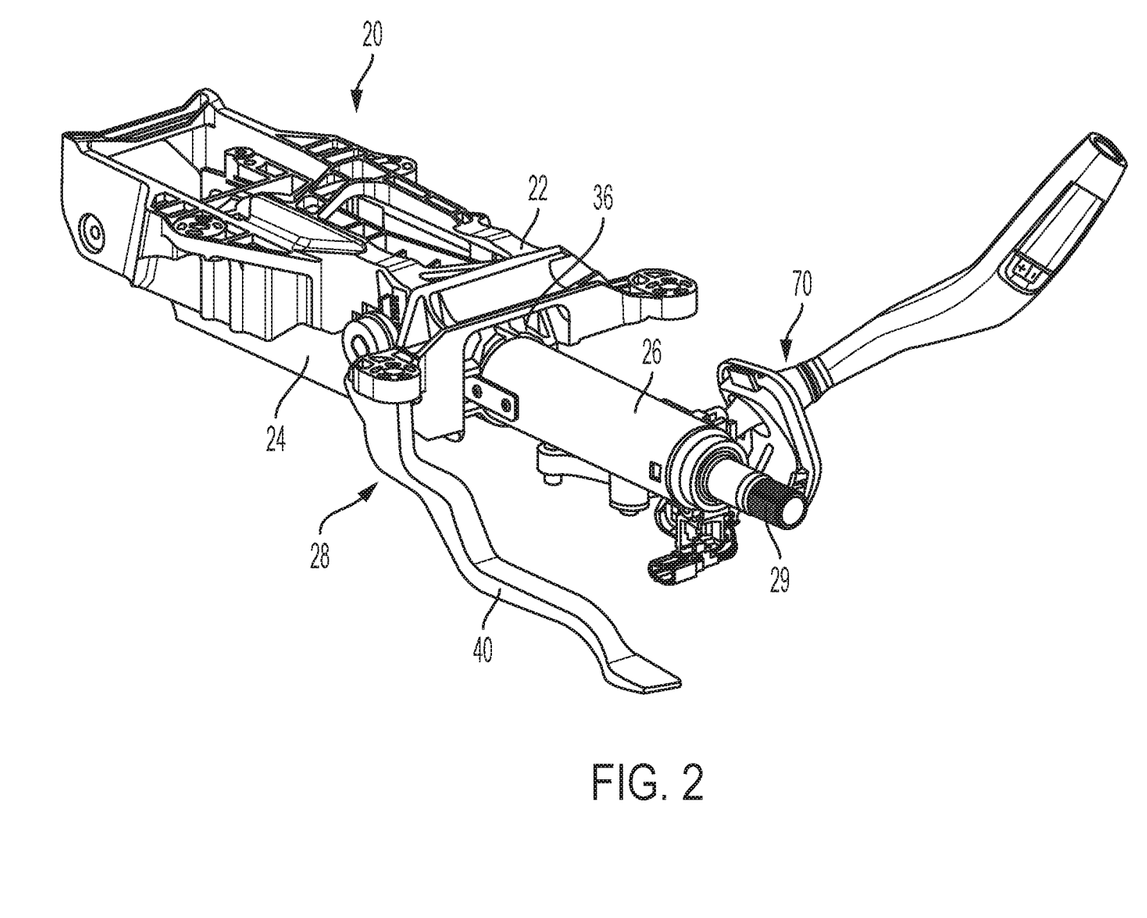
FIG. 2 is a top perspective view of the steering column with a column mounted shift mechanism.
Figure 3:
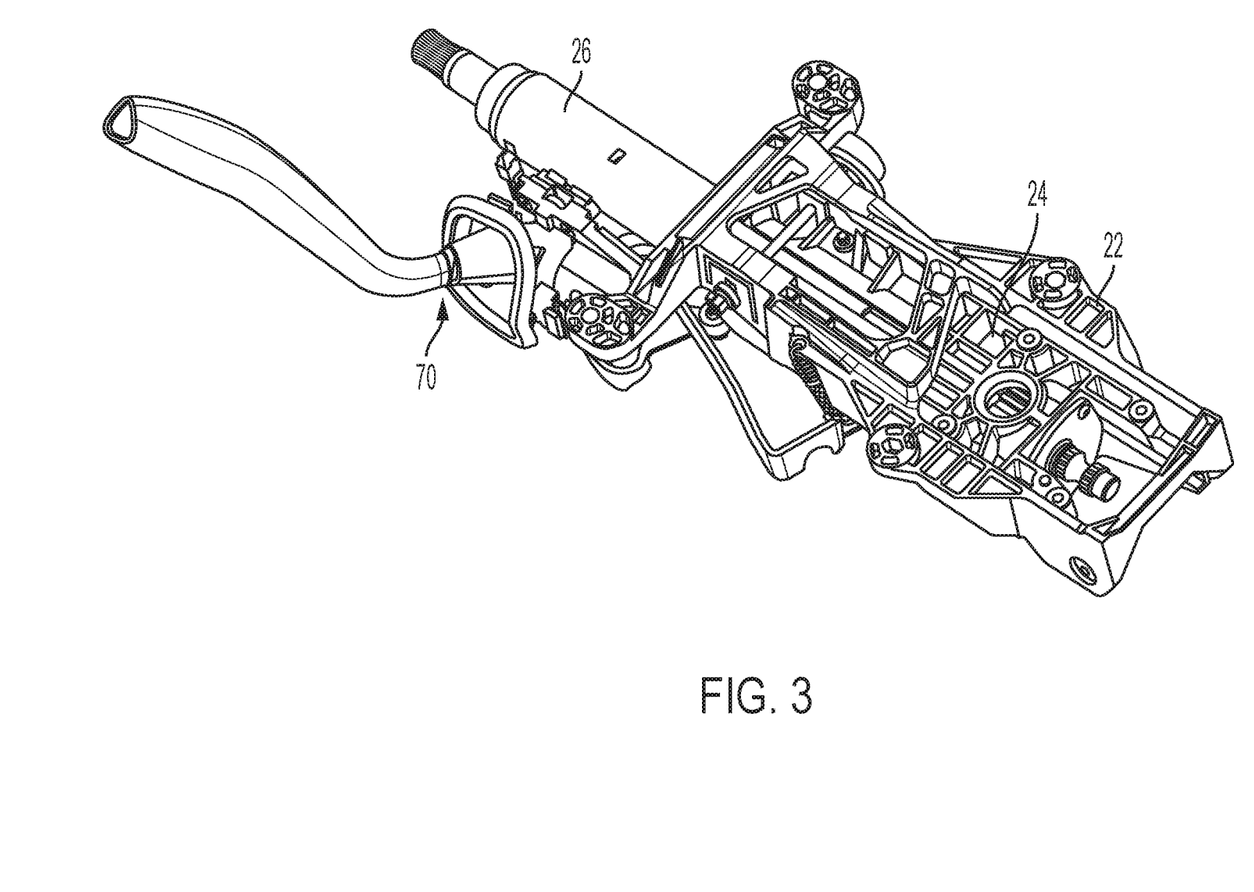
FIG. 3 is a bottom perspective view of the steering column with the column mounted shift mechanism.

Referring now to the Figures, where the invention will be described with reference to specific embodiments, without limiting same, an exemplary embodiment of a vehicle having a steering column 20 is illustrated in FIGS. 1-3.

The steering column 20 includes a support structure 22, a lower jacket 24, an upper jacket 26, and a rake adjustment assembly 28. The support structure 22 may be stationary and adapted to rigidly attach to a structure (e.g., dash) of a vehicle. A forward end portion 30 of the lower jacket 24 is pivotally attached to a stationary structure (not shown) of the vehicle for pivoting about a pivot axis. The upper jacket 26 is telescopically supported by the lower jacket 24 such that both co-extend along a common axis orientated substantially normal to the pivot axis. The upper jacket 26 axially projects outward from a rearward end portion 36 of the lower jacket 24, and is adapted to axially adjust between retracted and extended positions with respect to the lower jacket 24 for the convenience and/or comfort of a vehicle operator. A steering shaft 29 is supported in part by the upper jacket 26 for rotation, and projects axially rearward from the upper jacket 26 for engagement to a steering wheel (not shown).

Where the telescopic adjustment of the jackets 24, 26 is substantially horizontal and, where the steering column is so configured, generally functions to adjust the steering wheel rearward toward the vehicle operator and forward away from the vehicle operator, the rake adjustment assembly 28 is adapted to adjust the vertical position (i.e., rake position) of the steering wheel by pivoting the jackets 24, 26. In other words, the embodiments disclosed herein may be utilized in a steering column that has telescoping and/or a rake adjustment capability.

The rake adjustment assembly 28 includes a lever 40, a pin 42 (e.g., bolt), a lever cam 44, an inner cam 45, an outer teeth plate 46, a resilient biasing member 48 (e.g., a compressible spring or a torsion spring), a spring guide 50, a rake bumper 51, a thrust bearing 52, and a fastener 54 (e.g., threaded nut). In one example, the lever 40 is adapted to convert rotational, or rotary, motion about an axis into axial motion in the longitudinal direction of the pin 42. In one example, the spring 48 is adapted to produce an axial force that biases an enlarged head 64 of the pin 42 (e.g., a hexagonal bolt head) against the lever 40, and biases the outer teeth plate 46 against the thrust bearing 52.

Figure 6:
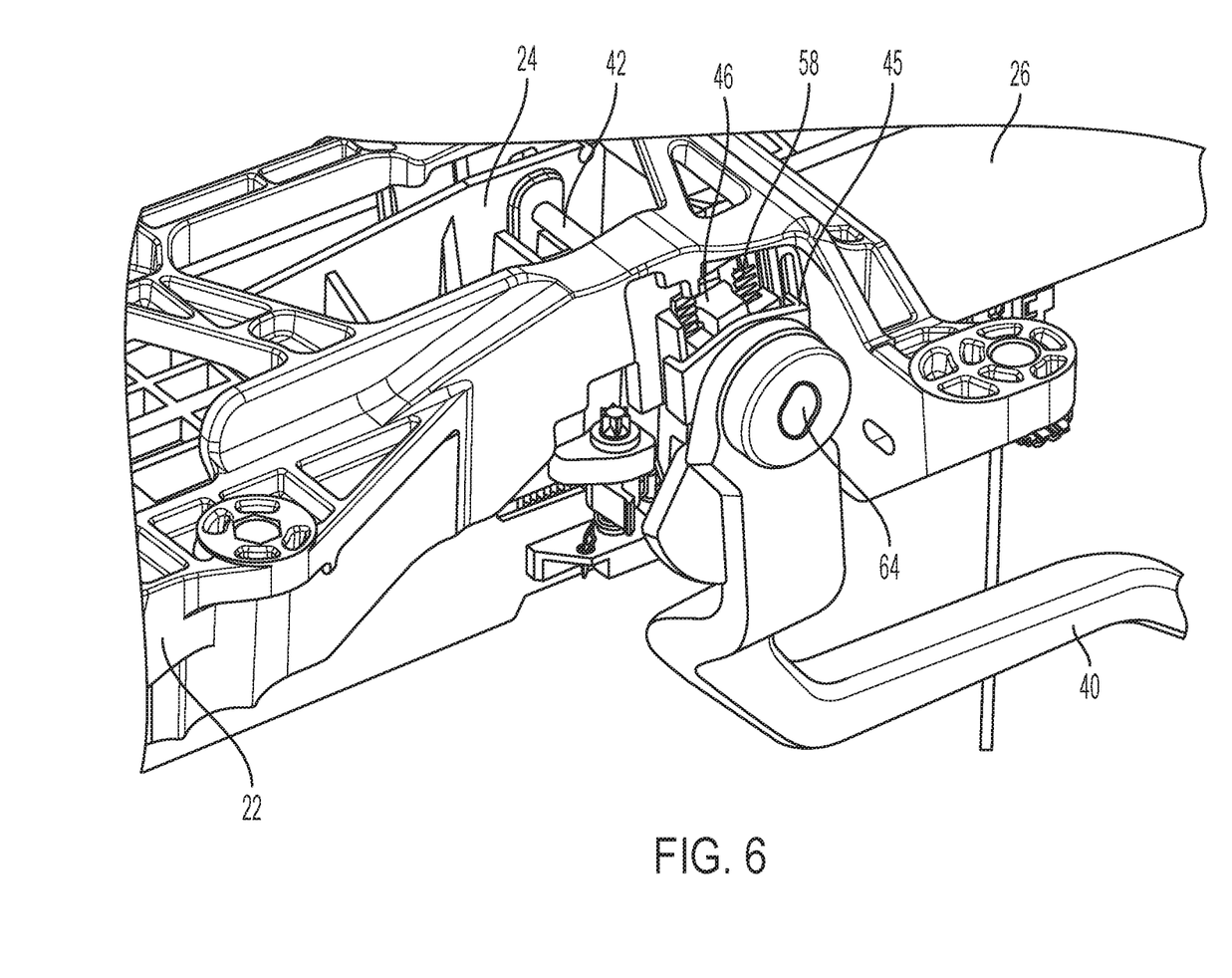
FIG. 6 is a perspective view of the rake adjustment assembly in a locked position.
Figure 7:
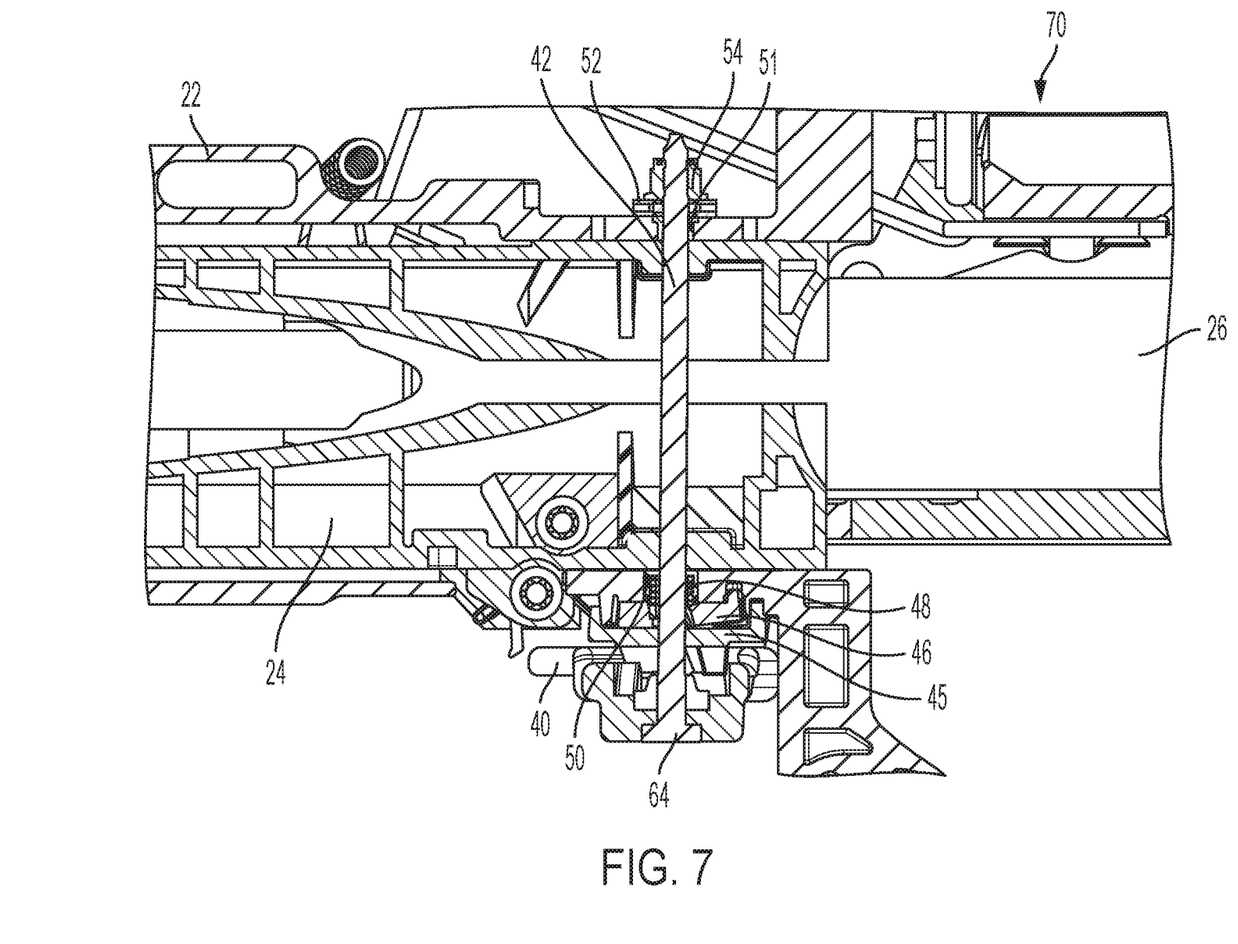
FIG. 7 is a bottom view of the rake adjustment assembly in the locked position.
Figure 8:
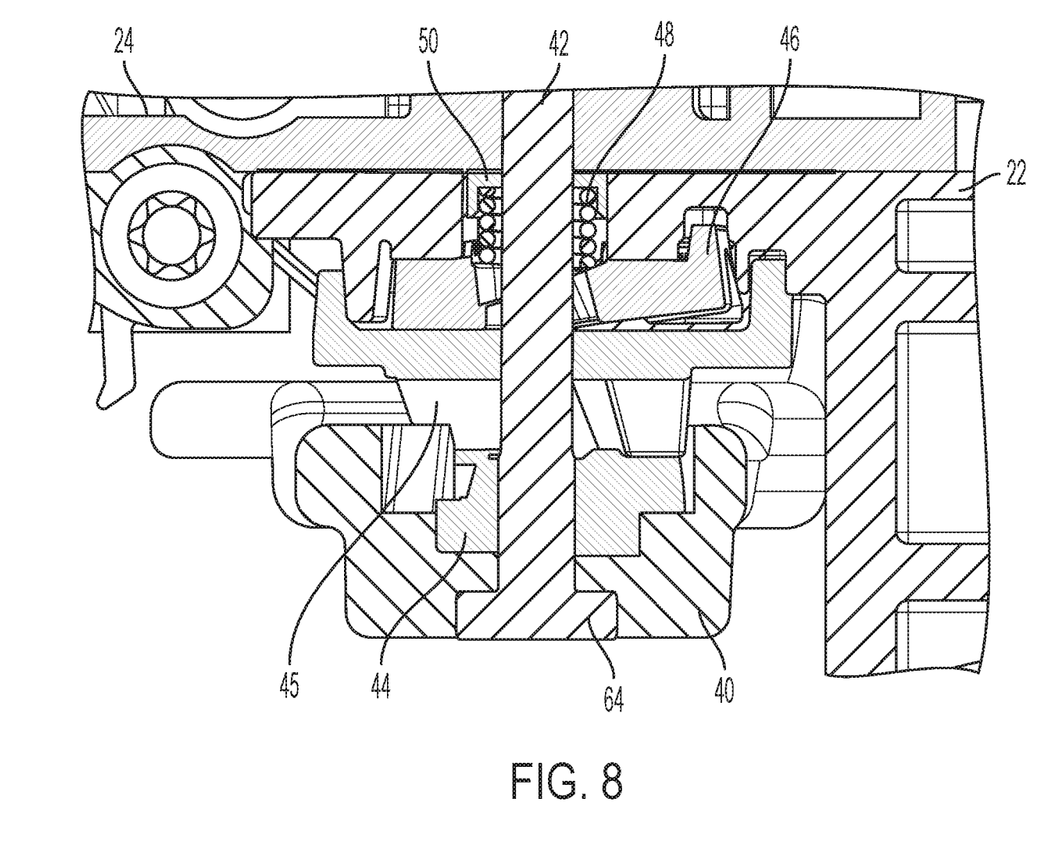
FIG. 8 is an enlarged view of a portion of the rake adjustment assembly in the locked position.
Figure 9:
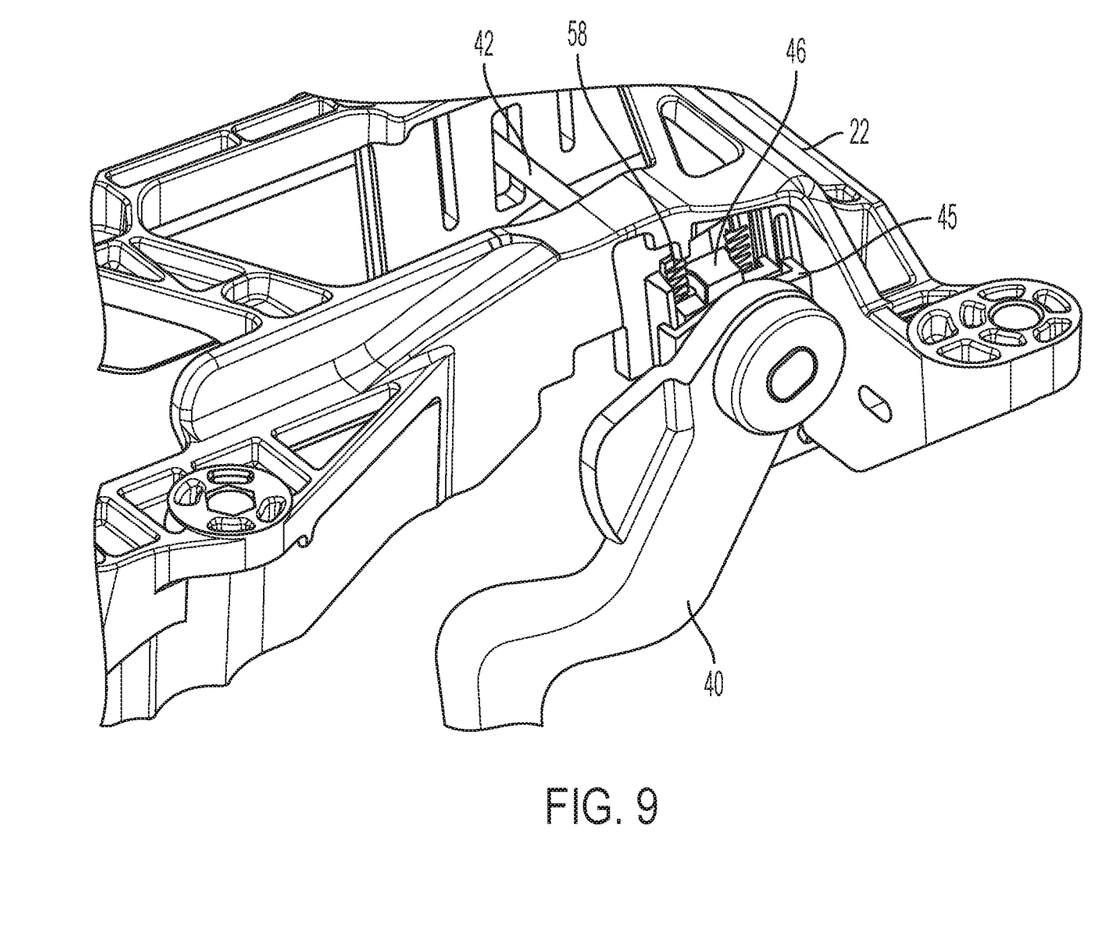
FIG. 9 is a perspective view of the rake adjustment assembly in an unlocked position.
Figure 10:
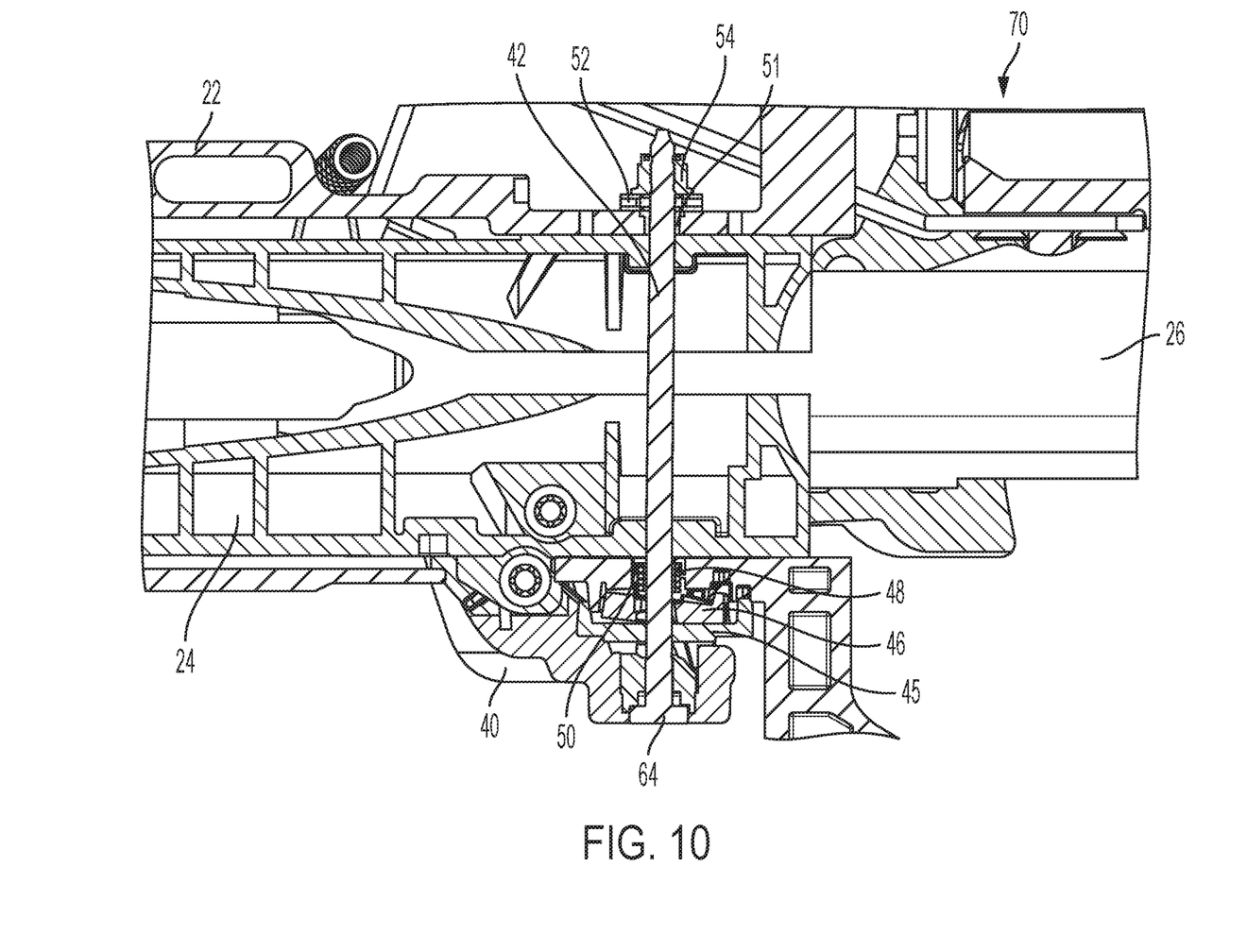
FIG. 10 is a bottom view of the rake adjustment assembly in the unlocked position.
Figure 11:
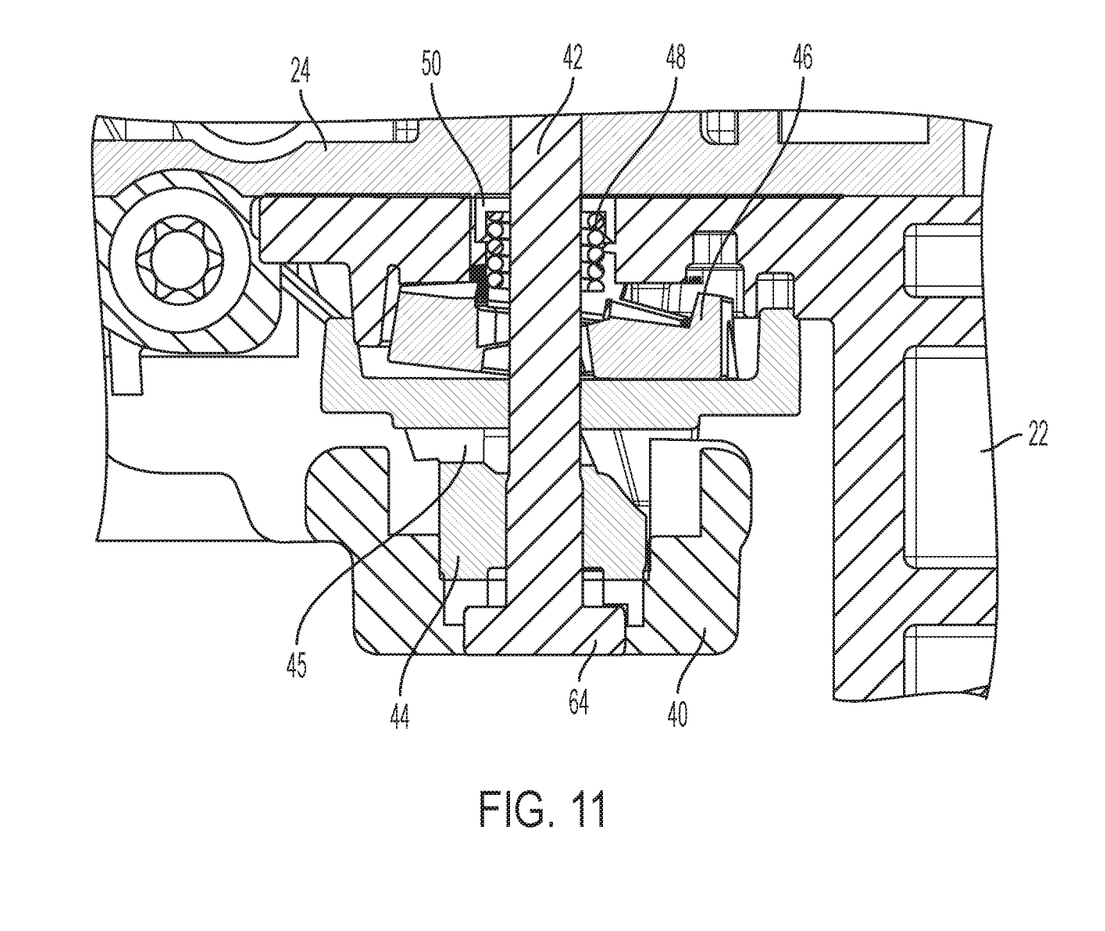
FIG. 11 is an enlarged view of a portion of the rake adjustment assembly in the unlocked position.

During operation, actuation of the lever 40 causes the pin 42 to rotate the lever cam 44, which axially biases the inner cam 45. The rotation of the pin 42, and the movement of the inner cam 45 causes the rake assembly 28 to switch between a lock position (FIGS. 6-8), and an unlocked position (FIGS. 9-11) by selectively engaging or disengaging the outer teeth plate 46 with rake teeth 58 which are operatively coupled to, or integrally formed with, the support structure 22.

As shown in FIG. 1, the rake teeth 58, the outer teeth plate 46, the resilient biasing member 48 and the spring guide 50 are on the same side of the steering column 20 as the lever 40, the lever cam 44 and the inner cam 45. On the opposite side of the steering column 20 is the rake bumper 51, the thrust bearing 52 and the fastener 54. In the illustrated embodiment, from a driver's perspective, the lever 40, the lever cam 44, the inner cam 45, the rake teeth 58, the outer teeth plate 46, the resilient biasing member 48 and the spring guide 50 are mounted to the left side of the steering column 20. In the same embodiment, from the driver's perspective, the rake bumper 51, the thrust bearing 52 and the fastener 54 are mounted to the right side of the steering column 20.

Figure 4:
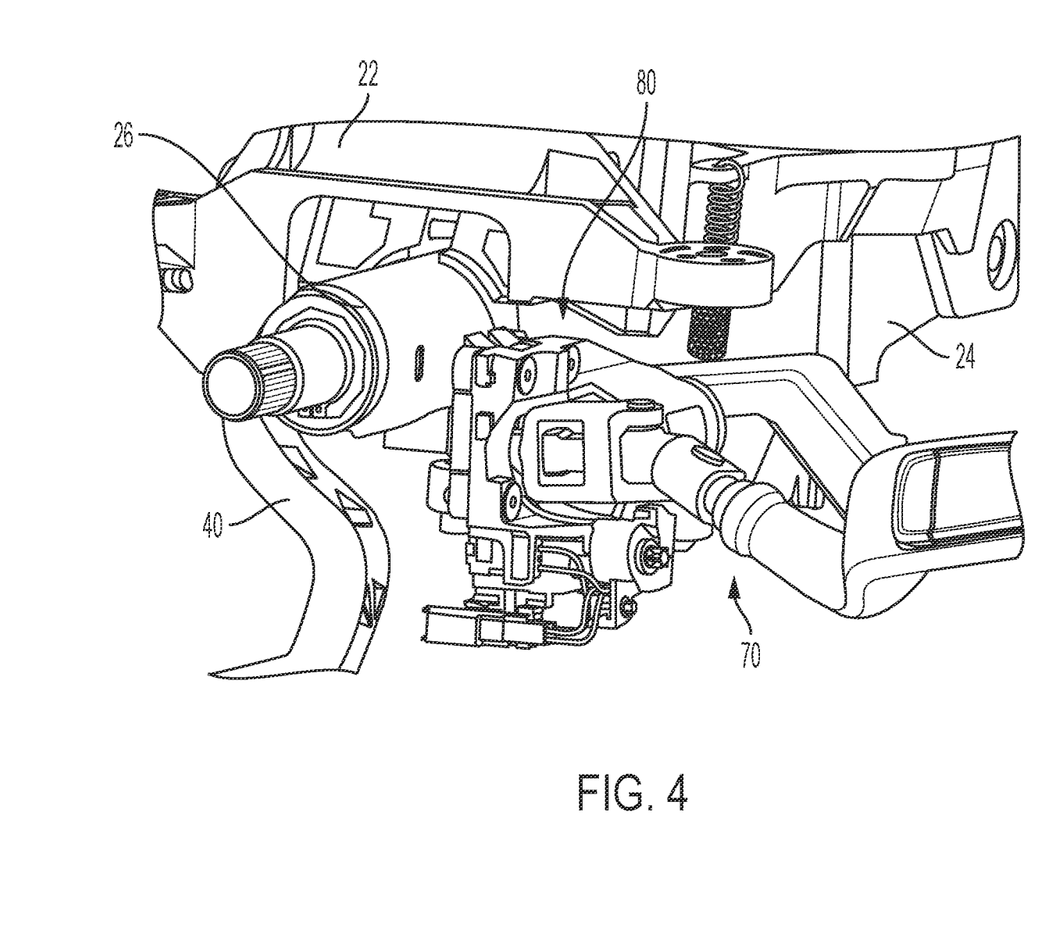
FIG. 4 is a front perspective view of the steering column.
Figure 5:
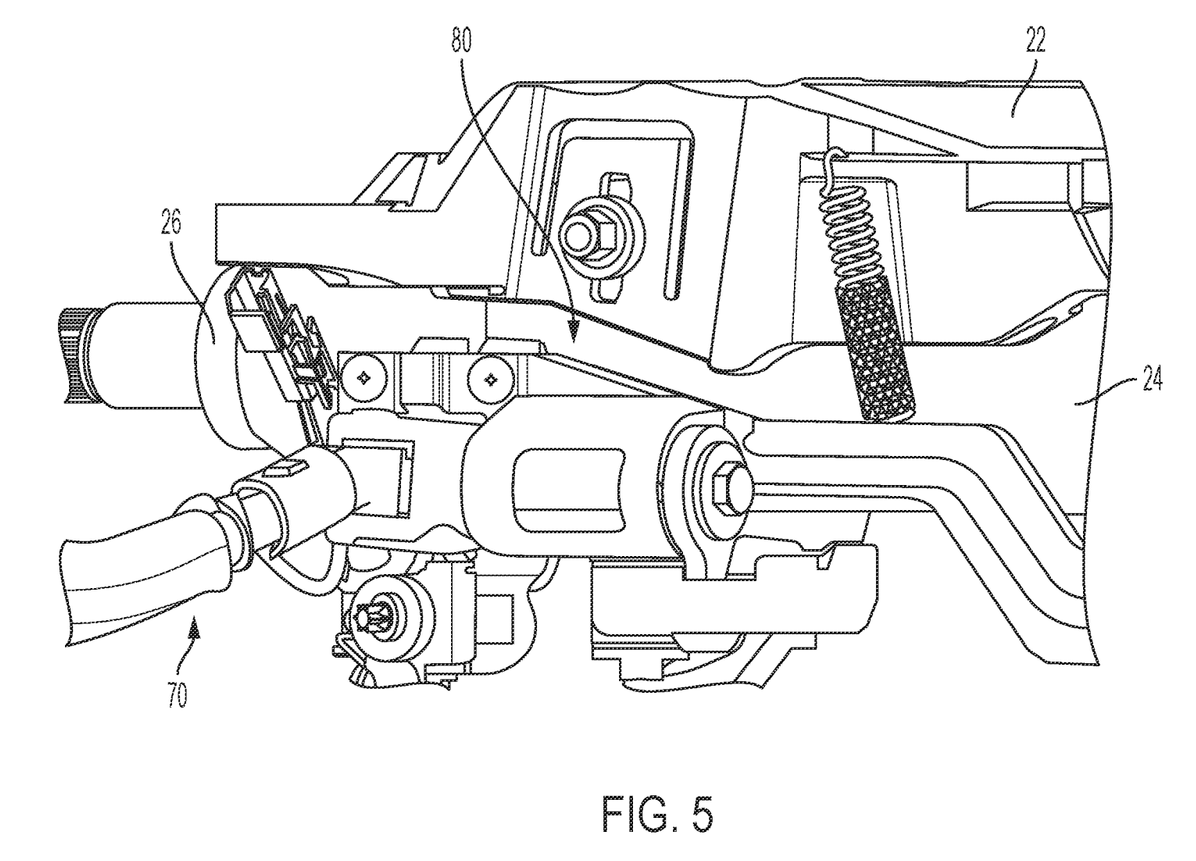
FIG. 5 is a side perspective view of the steering column.

Referring now to FIGS. 2-5, the above-described mounting locations of the rake adjustment assembly components allow for packaging space that accommodates a column mounted shift mechanism 70. This is based on the duality and symmetry of the rake adjustment assembly 28, which is applicable to both the right and left hand side of the steering column 20. This symmetry provides clearance on either side of the steering column 20 for packaging the shift mechanism 70, or to provide clearance from the support structure 22 for rearward column mounting access. This improves on prior assemblies that only package the locking components of the rake adjustment assembly 28 on one side (i.e., right side) of the steering column 28, which do not provide packaging space for the column mounted shift mechanism. FIGS. 4 and 5 illustrate the above-described packaging clearance, which is referenced generally with numeral 80.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
a jacket assembly pivotable about a rake axis, wherein the jacket assembly extends axially from a first end to a second end, wherein the first end is configured to be disposed axially forward in a vehicle relative to the second end, the jacket assembly comprising:
a lower jacket; and
an upper jacket in telescoping engagement with the lower jacket;
a pin having a rake adjustment lever operatively coupled to a first end of the pin, the rake adjustment lever on a first side of the jacket assembly and having a free end accessible to a user without a component attached thereto, wherein the rake adjustment lever is in direct contact with the pin and is a single, integrally formed component, wherein the rake adjustment lever is operatively coupled to the lower jacket;
a cam assembly operatively coupled to the rake adjustment lever and the pin and located on the first side of the jacket assembly;
a teeth locking mechanism operatively coupled to the pin and located on the first side of the jacket assembly and moveable between a locked position and an unlocked position, wherein the teeth locking mechanism comprises a teeth plate engaged with the cam assembly and moveable into and out of engagement with a support structure having teeth thereon to selectively lock and unlock a rake adjustment assembly, wherein the teeth on the support structure are integrally formed on the support structure;
a rake bumper operatively coupled to the pin and located on a second side of the jacket assembly; and
a gear shift mechanism mounted to the upper jacket on the second side of the jacket assembly, wherein the gear shift mechanism is located axially closer to the second end of the jacket assembly compared to a distance between the rake adjustment lever and the second end.

2. The steering column assembly of claim 1, further comprising a thrust bearing operatively coupled to the pin and located on the second side of the jacket assembly.

3. The steering column assembly of claim 1, further comprising a compression spring and a spring guide operatively coupled to the pin and located on the first side of the jacket assembly, the compression spring in contact with the teeth locking mechanism.

4. The steering column assembly of claim 1, wherein a clearance is defined between the gear shift mechanism and the support structure.

* * * * *